(12) United States Patent
Piccin et al.

(10) Patent No.: US 10,427,321 B2
(45) Date of Patent: Oct. 1, 2019

(54) METHOD AND INSTALLATIONS FOR PROCESSING A VENEER AND CORRESPONDING VENEER

(71) Applicant: Faurecia Interieur Industrie, Nanterre (FR)

(72) Inventors: Hugo Piccin, Munich (DE); Nathalie Durand, Amberieu en Bugey (FR)

(73) Assignee: Faurecia Interieur Industrie, Nanterre (FR)

( * ) Notice: Subject to any disclaimer, the term of this patent is extended or adjusted under 35 U.S.C. 154(b) by 1388 days.

(21) Appl. No.: 14/286,113

(22) Filed: May 23, 2014

(65) Prior Publication Data

US 2014/0349102 A1   Nov. 27, 2014

(30) Foreign Application Priority Data

May 24, 2013   (EP) ..................... 13305683

(51) Int. Cl.
*B27N 3/08*   (2006.01)
*B27M 1/02*   (2006.01)
(Continued)

(52) U.S. Cl.
CPC .............. *B27N 3/08* (2013.01); *B27D 1/005* (2013.01); *B27M 1/02* (2013.01); *B27N 3/18* (2013.01); *B32B 5/022* (2013.01); *B32B 5/024* (2013.01); *B32B 21/10* (2013.01); *B32B 21/14* (2013.01); *Y10T 156/10* (2015.01); *Y10T 156/1044* (2015.01); *Y10T 428/249921* (2015.04)

(58) Field of Classification Search
CPC . B27D 1/00; B27D 1/005; B27D 1/04; B27D 1/06; B27D 1/08; B27D 3/00; B27D 3/04; B27N 3/08; B27M 1/02

USPC ...... 144/332, 242.1, 250.12, 250.13, 250.16; 83/19, 444, 176, 447; 72/250, 252.5; 100/155, 176, 210
See application file for complete search history.

(56) References Cited

U.S. PATENT DOCUMENTS 266,163 A    10/1882 Burk
839,680 A *  12/1906 Voigt ................. B27D 1/005
                                               144/362

(Continued)

FOREIGN PATENT DOCUMENTS

CN    1291938 A    4/2001
CN    1338984 A    3/2002
(Continued)

OTHER PUBLICATIONS

European Search Report for Application EP 13 30 5683.8, dated Sep. 19, 2013, 8 pages.
(Continued)

*Primary Examiner* — Shelley M Self
*Assistant Examiner* — Smith Oberto Bapthelus
(74) *Attorney, Agent, or Firm* — Reising Ethington P.C.

(57) ABSTRACT

A method and processing station for producing a veneer having two parallel opposed faces and including at least one lignocellulosic layer made of lignocellulosic fibers having a grain extending along the opposed faces of the veneer. The processing station carries out the method by applying a compressive force to the veneer along at least one direction extending along the opposed faces of the veneer so as to mechanically compress the lignocellulosic fibers.

7 Claims, 4 Drawing Sheets

(51) Int. Cl.
   *B32B 21/14*   (2006.01)
   *B27N 3/18*    (2006.01)
   *B32B 21/10*   (2006.01)
   *B27D 1/00*    (2006.01)
   *B32B 5/02*    (2006.01)

(56) References Cited

U.S. PATENT DOCUMENTS

| | | | | |
|---|---|---|---|---|
| 1,902,032 | A * | 3/1933 | Horine | B27D 1/005 |
| | | | | 101/32 |
| 4,035,538 | A * | 7/1977 | Maekawa | B27D 1/06 |
| | | | | 428/155 |
| 4,139,407 | A * | 2/1979 | Etzold | B27D 1/005 |
| | | | | 144/332 |
| 4,243,465 | A * | 1/1981 | Gozzi | B27D 1/10 |
| | | | | 100/151 |
| 4,356,045 | A * | 10/1982 | Elford | B27M 3/0086 |
| | | | | 144/136.1 |
| 4,747,899 | A * | 5/1988 | Hasegawa | B27D 1/04 |
| | | | | 156/160 |
| 4,994,310 | A * | 2/1991 | Frisk | B32B 27/08 |
| | | | | 428/34.2 |
| 5,179,986 | A * | 1/1993 | Beuving | B27N 3/18 |
| | | | | 100/121 |
| 5,255,726 | A * | 10/1993 | Hasegawa | B27D 1/04 |
| | | | | 144/195.8 |
| 5,569,147 | A | 10/1996 | Erhard-Hollamn | |
| 5,989,468 | A * | 11/1999 | Lundgren | B27N 3/08 |
| | | | | 264/109 |
| 6,363,845 | B1 * | 4/2002 | Honda | B65H 5/00 |
| | | | | 100/215 |
| 6,755,928 | B1 | 6/2004 | Biagiotti | |

FOREIGN PATENT DOCUMENTS

| | | |
|---|---|---|
| CN | 101998896 A | 3/2011 |
| CN | 102756419 A | 10/2012 |
| DE | 820072 C1 | 11/1951 |
| DE | 977090 C1 | 1/1965 |
| EP | 0234220 A2 | 9/1987 |
| EP | 0600232 A1 | 6/1994 |
| FR | 1447418 A | 7/1966 |
| GB | 501172 A | 2/1939 |
| GB | 1 469 608 A | 4/1977 |
| JP | 2001310419 A | 11/2001 |
| JP | 2002370208 A | 12/2002 |
| JP | 3587436 B2 | 11/2004 |
| WO | WO9944814 A1 | 9/1999 |
| WO | WO0044540 A1 | 8/2000 |
| WO | WO2009124704 A1 | 10/2009 |

OTHER PUBLICATIONS

European Examination Report for EP application No. 13305683.8, dated Feb. 15, 2016, 8 pages.
Chinese Office Action in Chinese with English translation for CN application No. 201410220548.7, dated Jul. 3, 2017, 16 pages.
European Office Action corresponding to EP application No. 13 305 683.8, dated Nov. 26, 2018, 11 pages.

* cited by examiner

METHOD AND INSTALLATIONS FOR PROCESSING A VENEER AND CORRESPONDING VENEER

TECHNICAL FIELD

The present invention relates to a method of processing a veneer.

BACKGROUND

It is possible to provide a wood veneer comprising a lignocellulosic layer made of lignocellulosic fibers on an interior trim panel of an automotive vehicle. It is desirable to obtain a formable veneer to which it easy to impart a three dimensional (3D) shape to conform to the 3D shape of the trim panel.

SUMMARY

One of the objectives of the invention is to provide a method of processing a veneer that allows obtaining an easily formable veneer.

To this end, the invention proposes a method of processing a veneer having two parallel opposed faces and comprising at least one lignocellulosic layer made of lignocellulosic fibers having a grain extending along the opposed faces of the veneer, the method comprising applying a compressive force to the veneer along at least one direction extending along the opposed faces of the veneer so as to mechanically compress the lignocellulosic fibers.

In particular embodiments, the method may comprise one or several of the following features, taken in isolation or in any technically feasible combination:
- the method comprises applying a compressive force along the grain, applying a compressive force along at least one direction perpendicular to the grain and/or applying a compressive along at least one direction oblique with respect to the grain;
- the method comprises adjusting the temperature of the veneer during the step of applying a compressive force;
- a compressive force is applied to the veneer by applying one edge of the veneer against a stop and biasing an opposed edge of the veneer towards the stop;
- the method comprises biasing the veneer towards the stop by passing the veneer in a nip between two parallel contra-rotative rollers;
- a compressive force is applied to the veneer by applying at least one projection against a face of the veneer and moving the projection along the face of the veneer;
- projections are provided on the external surface of at least one compression roller applied against the face of the veneer, the veneer being moved in a moving direction relative to the compression roller and the compression roller being rotated to move the projections in contact with the veneer opposite to the moving direction;
- the method comprises a counter-pressure roller defining a nip with the compression roller, the veneer being moved through the nip in contact with the projections;
- the counter-pressure roller comprises a compressible external sleeve;
- the projections are provided as splines alternating with grooves along the circumference of the compression roller;
- the compression roller comprises axial splines;
- the veneer comprises a backing layer;
- the backing layer is chosen in the following group: a woven fabric, a non-woven fabric, a paper sheet, a cardboard sheet and a plastic sheet;
- the veneer comprises a protective layer;
- the method comprises applying an extension force on the veneer to extend the lignocellulosic fibers longitudinally;
- the method comprises forming the initially flat veneer to impart a 3D shape to the veneer.

The invention also relates to a veneer having opposed faces and comprising at least one lignocellulosic layer made of lignocellulosic fibers extending along the opposed faces, wherein the lignocellulosic fibers have been subjected to a longitudinal mechanical compression, namely by a method as defined above.

The invention also relates to an interior trim part comprising such a veneer.

The invention also relates to a veneer compression station, for processing a veneer having two parallel opposed faces and comprising at least one lignocellulosic layer made of lignocellulosic fibers having a grain extending along the opposed faces of the veneer, the station comprising two contra-rotative rollers defining between them a nip and a stop located in register with the nip for passing a veneer through the nip and biasing the veneer against the stop to apply a compression force on the veneer along the opposed faces of the veneer so as to mechanically compress the lignocellulosic fibers.

The invention still relates to a veneer compression station, for processing a veneer having two parallel opposed faces and comprising at least one lignocellulosic layer made of lignocellulosic fibers having a grain extending along the opposed faces of the veneer, the station comprising two co-rotative rollers defining between them a nip, one of the rollers comprising projections distributed around the circumference of the roller and arranged to contact a face of a veneer passing through the nip.

BRIEF DESCRIPTION OF THE DRAWINGS

The invention and its advantages will be better understood on reading the following description given solely by way of example and with reference to the appended drawings, in which.

DETAILED DESCRIPTION OF THE ILLUSTRATED EMBODIMENT(S)

Figure 1:
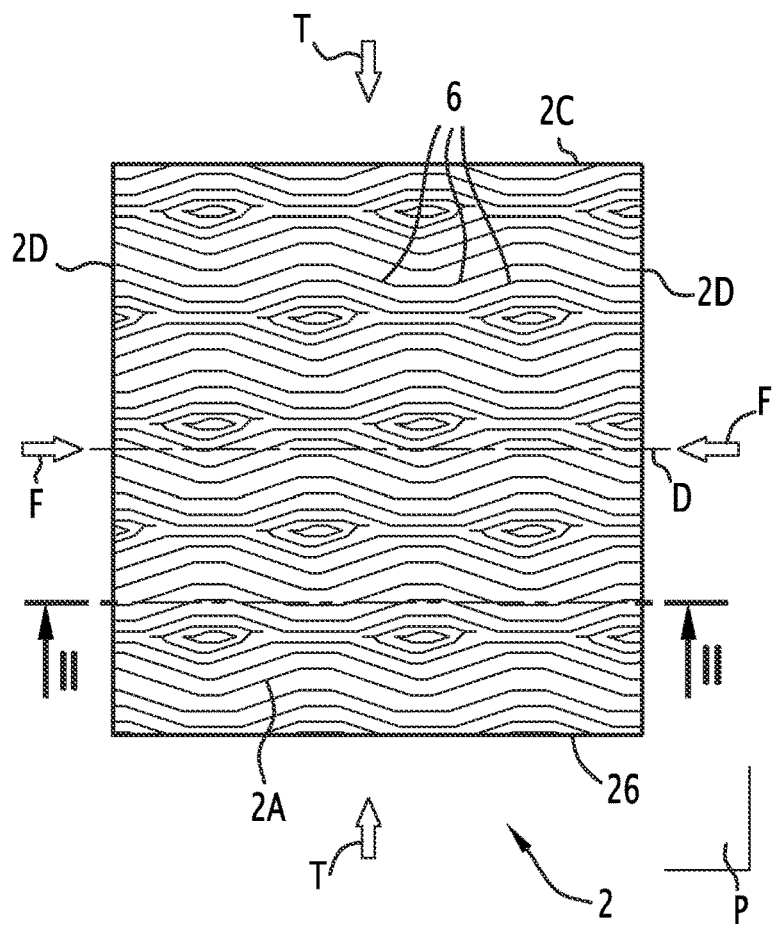
FIG. 1 is a top view of a veneer.
Figure 2:
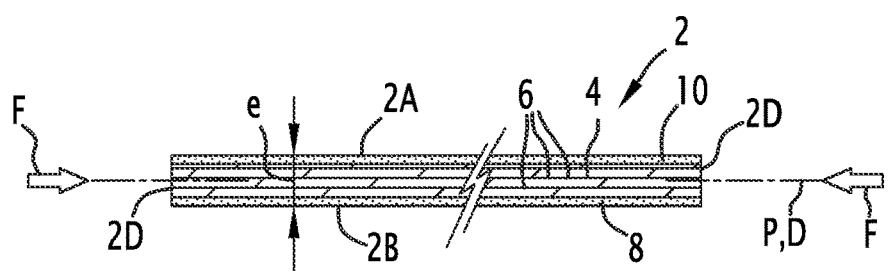
FIG. 2 is a sectional view of the veneer taken along II-II on FIG. 1.

The veneer 2 illustrated on FIGS. 1 and 2 is a wood veneer which is for example intended to be formed and applied on a trim part, namely vehicle trim part, for imparting a positive wood aspect.

The veneer 2 is plate shaped. The veneer 2 comprises two opposed faces. The faces include a front face 2A intended to be visible and a rear face 2B intended to be hidden.

The veneer 2 has a uniform thickness e perpendicular to the front face 2A and rear face 2B. The thickness e of the veneer 2 is for example equal or less than 1.5 mm, namely equal or less than 1.0 mm, preferably equal or less than 0.8 mm.

The veneer 2 has edges delimiting the contour of the veneer 2. The veneer 2 has for example a polygonal contour, namely a quadrangular contour. The veneer 2 has a pair of parallel opposed first edges 2C and a pair of parallel opposed second edges 2D. The first edges 2C are perpendicular to the second edges 2D thus imparting a rectangular contour to the veneer 2.

The veneer 2 is initially flat and extends along a veneer plane P corresponding to the plane of FIG. 1.

The veneer 2 comprises at least one lignocellulosic layer 4 made of lignocellulosic fibers 6. The lignocellulosic layer 4 is for example made of wood fibers, preferably natural wood fibers. The lignocellulosic layer 4 is for example a sheet of wood.

Wood includes elongated wood cells including fibers, hollow fiber-vessel and/or hollow fiber-tracheid owing to the nature of the wood. The term "fibers" here designates any of these wood cells The lignocellulosic fibers 6 of the lignocellulosic layer 4 extend along a general fiber line or "grain" D. The lignocellulosic fibers 6 extend along the opposed faces 2A, 2B of veneer 2, substantially parallel to the opposed faces 2A, 2B of the veneer 2. The grain D extends substantially parallel to the opposed faces 2A, 2B of the veneer 2.

In the example, the lignocellulosic fibers 6 extend parallel to the first edges 2C and perpendicular to the second edges 2D.

The veneer 2 comprises for example one single lignocellulosic layer 4. Alternatively the veneer 2 comprises several superimposed lignocellulosic layers.

The veneer 2 comprises a backing layer 8 laminated on the lignocellulosic layer 4 on the side of the rear face of the veneer 2. The backing layer 8 is for example adhered to the lignocellulosic layer 4 with using an adhesive. The backing layer 8 is for example a textile, namely a woven or non-woven fabric, a paper sheet, a cardboard sheet or a plastic film.

The backing layer 8 reinforces the very thin lignocellulosic layer 4. The backing layer 8 optionally promotes bonding of the veneer 2 to a substrate. The substrate is for example a substrate made of plastic material overmolded on the rear face of the veneer 2.

The veneer 2 optionally comprises a protection coating 10 laminated on the lignocellulosic layer 4 on the side of the front face of the veneer 2.

The function of the protection coating 10 is to protect the lignocellulosic layer 4 namely from UV radiations that may accelerate aging of the lignocellulosic layer 4. The protection coating 10 comprises one or several protection layers. The protection coating 10 is for example made of a synthetic resin, for example a varnish. The protection coating 10 is coloured, transparent or translucent. The protection coating 10 is for example applied on the lignocellulosic layer 4 in liquid state and dried to harden.

The multilayer veneer 2 comprising at least one lignocellulosic layer and a backing layer 8 is generally named wood sheet complex (WSC).

In view of forming a trim part comprising a plastic substrate covered by the veneer 2, the veneer 2 is for example shaped in three-dimension (3D) during overmolding of the molten plastic material under pressure.

Figure 3:
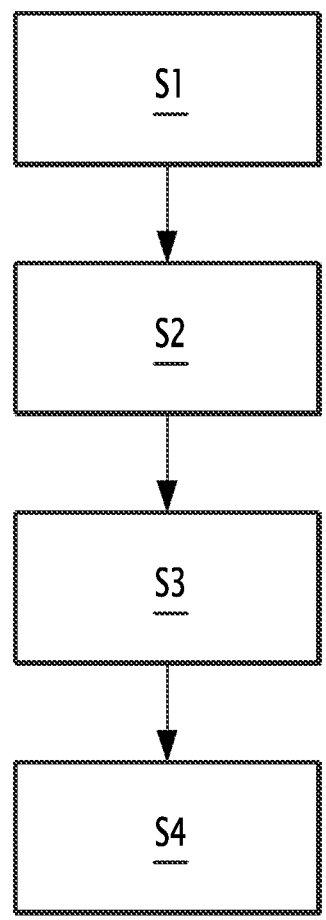
FIG. 3 is a flow chart illustrating steps of a method of fabricating a veneer including compressing the veneer.

FIG. 3 illustrates steps of a method of processing the veneer 2 of FIGS. 1 and 2 to increase formability of the veneer 2 that is the capacity of the veneer 2 to be easily shaped in 3D.

The method comprises at least one step of applying a compressive force on the veneer 2 so as to compress the veneer 2 in a direction parallel to the faces 2A, 2B of the veneer 2.

The method comprises a longitudinal compression step S1 of applying a compressive force F to the veneer 2 so as to mechanically compress the lignocellulosic fibers 6 longitudinally, that is along the grain D.

The compression is performed such as to reduce the dimension of the veneer 2 along the grain D by about 1% to about 15%.

Optionally, the method comprises a transverse compression step S2 of applying a compressive force T to the veneer 2 to compress the lignocellulosic fibers transversely, perpendicularly to the grain D. The compressive force T is applied on the veneer 2 parallel to the faces 2A, 2B in a transverse direction perpendicular to the grain D.

Optionally, the method comprises at least one oblique compression step of applying a compressive force to the veneer 2 parallel to the faces 2A, 2B and obliquely with respect to the grain D and the transverse direction T. The method comprises for example step(s) of applying a compressive force at 45° with respect to the grain D.

Optionally, subsequently to a compression step, the method comprises an elongation step of applying an elongating force to the veneer 2 opposite to the compression force applied in the compression step to restore at least partially the initial dimension of the veneer 2 in the corresponding direction.

The method comprises for example a longitudinal elongation step S3 of applying an elongating force to the veneer 2 so as to elongate the lignocellulosic fibers longitudinally. The method comprises for example a transverse elongation step S4 of applying an elongating force to the veneer 2 so as to elongate the veneer 2 perpendicularly to the lignocellulosic fibers.

The compression steps are operated consecutively and the elongating steps are performed consecutively thereafter. In the example, as illustrated, the steps S1 through S4 are thus operated in the following sequence: S1, S2, S3, S4.

Alternatively, a step of elongating the veneer 2 is performed immediately after the corresponding opposite compression step. In an alternative to the example, the steps S1 through S4 are thus operated in the following sequence: S1, S3, S2, S4.

In any case, each elongating step is performed after the corresponding compression step.

Optionally, the processing method performs compression step(s) and/or elongation step(s) on the veneer 2 being at an adjusted temperature, preferably to a temperature comprises between −18° C. to −2° C. Adjusting the temperature of the veneer 2 promotes capacity of compression and elongation by altering the microstructure of the fibers.

Figure 4:
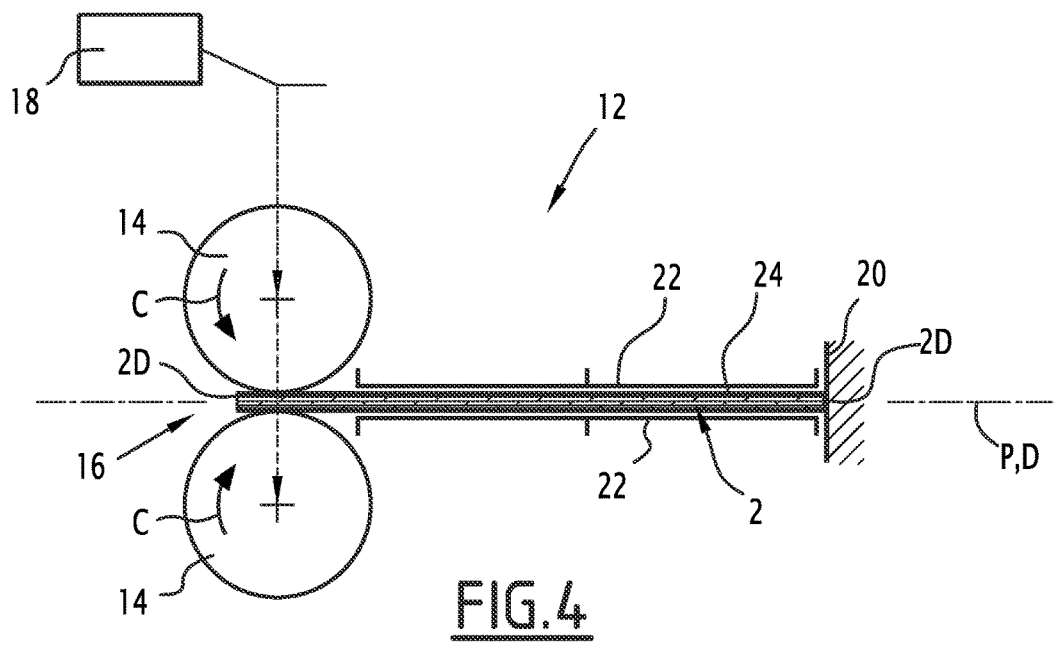
FIG. 4 is a diagrammatical side view of an station for compressing the veneer of FIGS. 1 and 2.

FIG. 4 illustrate a compression station 12 for implementing the processing method. The compression station 12 is configured for compressing the flat veneer 2 in a direction parallel to the plane of the veneer 2.

The compression station 12 comprises a pair of parallel opposed rollers 14 defining between them a nip 16 for receiving the veneer 2. The rollers 14 are contra-rotative. They are coupled to a driving unit 18 so to be rotated in opposite angular directions.

The compression station 12 comprises a stop 20 in register with the nip 16. The stop 20 is arranged such that an edge of veneer 2 driven through the nip 16 between the rollers 14 is biased against the stop 20.

The compression station 12 comprises a pair of parallel opposed anti-buckling plates 22 extending between the nip 16 and the stop 20 with defining between them a channel 24 for receiving the veneer 2.

Upon operation, the veneer 2 is passed through the nip 16 such that it is pushed by the rollers 14 against the stop 20 and compressed between the rollers 14 and the stop 20 along a direction parallel to the opposed faces 2A, 2B of the veneer 2. The anti-buckling plates 22 located on either sides of the compressed veneer 2 prevent the veneer 2 from buckling For compressing the veneer 2 along different directions, the veneer 2 is oriented in a first orientation and passed through the first compression station 12 and then pivoted in a second orientation different from the first orientation and passed again through the first compression station 12. The veneer 2 is rotated about a rotation axis perpendicular to the plane P of the veneer 2.

For exerting a compressing force on the veneer 2 of FIGS. 1 and 2 so as the compress the fibers along the grain D, the veneer 2 is passed in the compression station so as to bias one of the second edges 2D against the stop 20 and to push the opposed second edge 2D received in the nip 16 towards the stop 20 with driving the rollers 14, as illustrated on FIG. 4.

Figure 5:
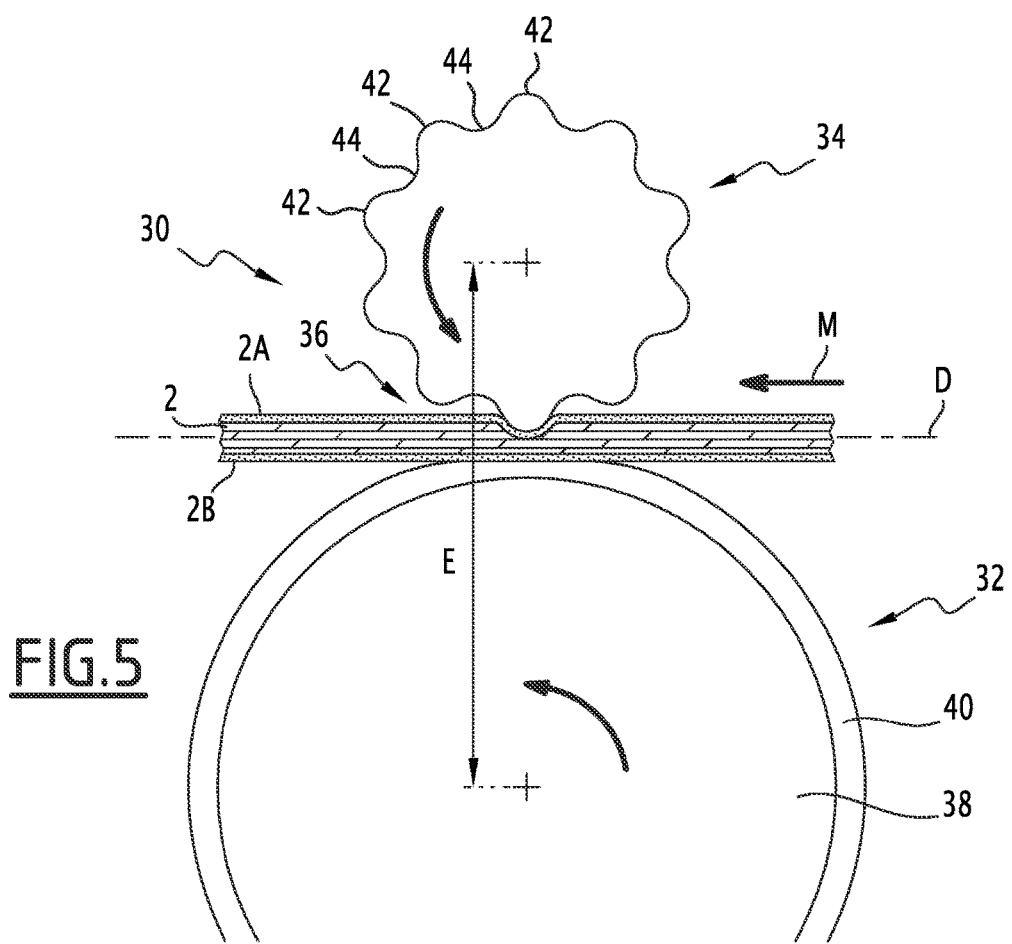
FIG. 5 is a diagrammatical side view of a another station for compressing the veneer of FIGS. 1 and 2.

FIG. 5 illustrates another compression station 30 for implementing the processing method.

The compression station 30 comprises a counter-pressure roller 32 and a compression roller 34 arranged parallel one to the other and defining a nip 36 for a veneer 2 to pass between the counter-pressure roller 32 and the compression roller 34.

The counter-pressure roller 32 and the compression roller 34 are driven in rotation by a driving unit 18 such that the counter-pressure roller 32 and the compression roller 34 are co-rotative and rotate in the same angular direction.

The counter-pressure roller 32 comprises a rigid cylinder 38 covered by a compressible external sleeve 40. The cylinder 38 is made e.g. of metal and the external sleeve 40 is made e.g. of rubber, silicone or plastic.

The counter-pressure roller 32 is provided to drive the veneer 2 passing through the nip 36. In this view, the external sleeve 40 is provided to adhere on the rear face 2B of the veneer 2, at least more than the external surface of the compression cylinder 34 on the front face 2A.

In operation, the counter-pressure roller 32 contacts the rear face 2B and drives the veneer 2 in a moving direction M and the compression roller 34 scrubs the front face 2A of the veneer 2 opposite the moving direction M.

The compression roller 34 has an external surface provided with projections for scrubbing the front face 2A so as to apply on the veneer 2 a compressive force parallel to the faces 2A, 2B of the veneer 2.

In the example, projections are provided as splines 42 separated by grooves 44 alternating with the splines 42 along the circumference of the compression cylinder 34.

As illustrated on FIG. 5, in axial view of the compression roller 36, the splines 42 and grooves 44 impart a wave shaped circumferential profile. The circumferential profile is substantially sinusoidal. The height of the splines 42 is exaggerate on FIG. 5 for clarity.

In operation, a spline 42 in contact with a veneer 2 passing in the nip 36 compresses the fibers in the region of the veneer 2 located immediately upstream the spline 42 when considering the moving direction M.

Owing to the circumferential profile of the compression roller 34, the compressive force applied by the compression roller 34 to the veneer 2 is not uniform along the length of the veneer. Regions of higher compression alternate with region of lesser compression along the length of the veneer.

In view of obviating this feature, a compression station comprises for example several compression rollers for applying a compression force in the same direction relative to the veneer 2 but arranged such that the regions of higher compression of the different compression rollers are offset.

Figure 6:
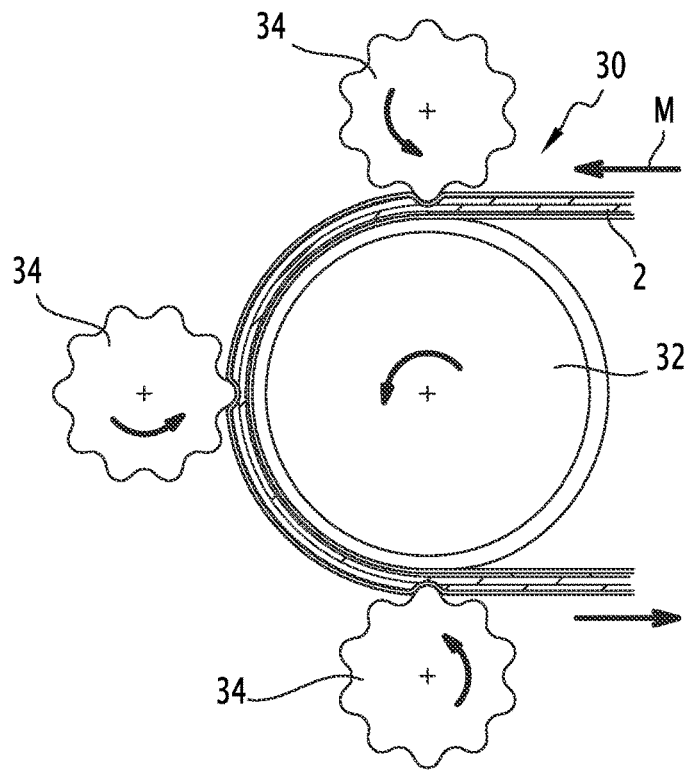
FIGS. 6 and 7 are diagrammatical side views of variants of the station of FIG. 5.

As illustrated on FIG. 6, a compression station 30 comprises several compression rollers 34 in a satellite distributed around the same driving roller 32. The veneer 2 is partially wound around the driving roller 32 to pass in the nip 36 defined by each compression roller 34. The compression rollers 34 are offset such that the regions of higher compression of the different compression rollers 34 are offset.

Figure 7:
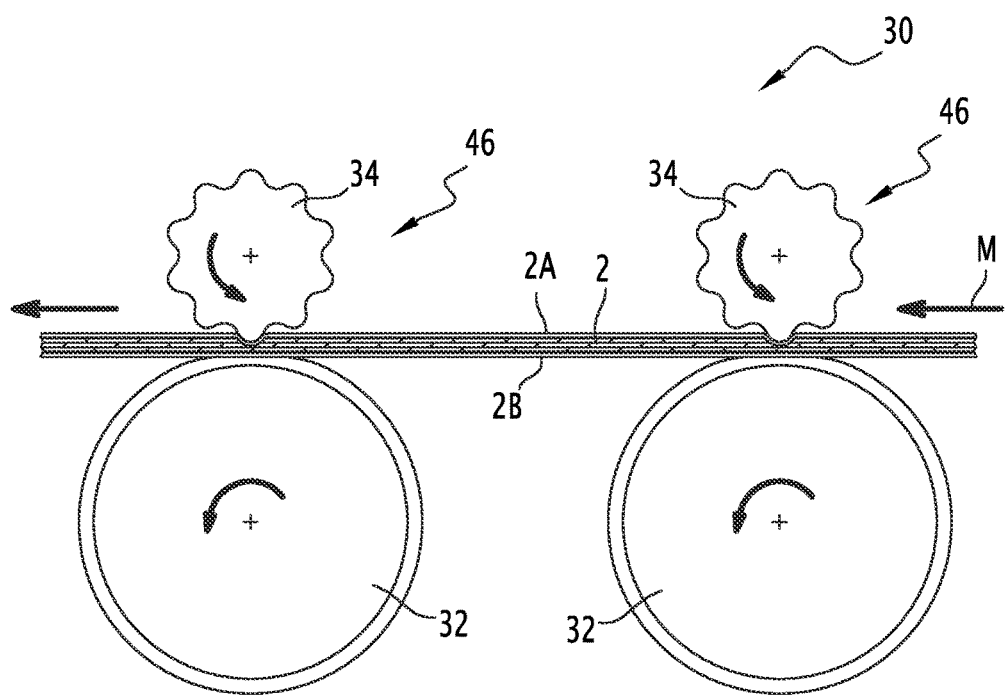

Alternatively, as illustrated on FIG. 7, a compression station 30 comprises several compression units 46 distributed along the path of the veneer 2, each compression unit 46 comprising a driving roller 32 associated to a compression roller 34. The compression rollers 34 are offset such that the regions of higher compression of the different compression rollers 34 are offset.

The direction of a compression force exerted by a compression cylinder 34 is substantially perpendicular to the direction of extension of the splines 42. Axial splines 42 extending parallel to the axis of the compression roller 34 apply a compression force parallel to the moving direction M of the veneer 2. However, non rectilinear splines are conceivable.

In view of compressing the veneer in different directions along the faces of the veneer, it is possible to pass the veneer several times through a compression station with modifying the orientation of the veneer to modify the orientation of the grain D of the veneer between each passage.

Owing to the processing method of the invention, formability of the veneer is increased, thus making it easy to impart a desired 3D shape to the veneer.

The step of applying a compressive force to the veneer and the step of 3D forming the veneer are operated sequentially. The veneer is first subjected to a compressive force such as to compress lignocellulosic fibers and increase formability, without imparting a permanent 3D shape to the veneer, and subsequently the initially flat veneer is formed to impart a 3D shape, e.g. during overmolding of the veneer or any other shaping method. The veneer remains substantially flat at the end of the step of applying a compressive force to the veneer.

The lignocellulosic fibers have great properties among which flexibility which imparts formability of a veneer comprising a lignocellulosic layer. A lignocellulosic fiber is composed of different elements including lignin, cellulose and hemi cellulose forming a fiber elongated along a fiber axis parallel to the fiber direction of wood. The fiber comprises fibrous walls comprising fibrils extending helically around the fiber axis with various helix angles. Lignocellulosic fibers of natural wood comprise at least three fibril orientations.

Compressing a lignocellulosic fiber along its fiber axis deforms the walls in such a manner that it imparts subsequently more flexibility to the fiber. Additional compression(s) transverse and/or oblique relative to the fiber axis further increases flexibility.

The mechanical compression(s) of the lignocellulosic fibers can be detected on the veneer, even in case a corresponding elongation was performed. Indeed, the mechanical compression(s) lead to compaction and/or fragmentation of the lignocellulosic fibers. This can be detected during a microscope analysis before a heating of the veneer causing a fusion of lignin that will fill the gaps between the fragmented fibers.

Therefore, the manufacturing process allows obtaining a veneer which comprises at least one lignocellulosic layer and which has improved formability. This enables namely to impart to the veneer a non-developable 3D shape.

One risk upon compressing the veneer parallel to the opposed faces of the veneer is to destroy the lignocellulosic layer. Indeed, a lignocellulosic layer subjected to a compression along the grain tends to burst.

Performing the compression on the veneer comprising the reinforcement backing layer laminated onto the lignocellulosic layer prevents the lignocellulosic layer from bursting.

In a compression station as in FIGS. 3, the provision of anti-buckling plates assists in preventing bursting of the veneer. In a compression station as in FIG. 4, anti-buckling plates are not necessary.

Compression station or installations as in FIGS. 3-7 are adapted for processing plates of veneer. A compression station as in FIGS. 4-7 are further adapted for continuously processing a web of veneer. Such a web is provided for example by using a continuous web of backing layer to adhere several sheets of wood successively along the web of backing layer. Veneers are cut from the web of veneer after the compression steps.

The longitudinal or oblique mechanical compression of the lignocellulosic fibers may be detected on the veneer, even in case a corresponding elongation was performed.

The invention claimed is:

1. Veneer compression station, for processing a veneer having two parallel opposed faces and comprising at least one lignocellulosic layer made of lignocellulosic fibers having a grain extending along the opposed faces of the veneer, the station comprising two contra-rotative rollers defining between them a nip and a stop located such that an edge of the veneer is biased against the stop when driven between the rollers, the veneer being pushed against the stop by the rollers such that a compressive force is applied by the rollers to a portion of the veneer located between the nip and the stop in a direction parallel with the opposed faces of the veneer so as to mechanically compress the lignocellulosic fibers, wherein the compressive force is sufficient to reduce a dimension of the veneer in said direction.

2. Veneer compression station according to claim 1, wherein the compressive force is sufficient to reduce said dimension of the veneer by an amount in a range from 1% to 15%.

3. Veneer compression station according to claim 1, further comprising anti-buckling plates defining between them a channel for receiving the veneer, the anti-buckling plates being located between the nip and the stop and configured to prevent the veneer from buckling during compression.

4. Veneer compression station according to claim 1, wherein the compressive force deforms walls of the lignocellulosic fibers in a manner that imparts increased flexibility to the fibers.

5. Veneer compression station according to claim 1, wherein application of the compressive force by the compression station increases the formability of the veneer in a subsequent 3D forming operation.

6. Veneer compression station, for processing a veneer having two parallel opposed faces and comprising at least one lignocellulosic layer made of lignocellulosic fibers having a grain extending along the opposed faces of the veneer, the station comprising two rollers defining between them a nip and rotating in the same angular direction, one of the rollers comprising projections distributed around the circumference of the roller and arranged to contact and to scrub one of the faces of the veneer passing through the nip.

7. Veneer compression station according to claim 6, wherein the other one of the rollers comprises a rigid cylinder covered by a compressible external sleeve.

* * * * *